United States Patent [19]

Doherty et al.

[11] Patent Number: 4,600,455
[45] Date of Patent: Jul. 15, 1986

[54] METHOD FOR BONDING A THIN SHEET TO A RIGID BODY

[75] Inventors: Robert J. Doherty, Lakeville, Mass.; Joseph J. Allan, Hyattsville, Md.

[73] Assignee: The United States of America as represented by the Secretary of the Navy, Washington, D.C.

[21] Appl. No.: 634,344

[22] Filed: Jul. 25, 1984

[51] Int. Cl.[4] .................. B32B 31/00; B30B 1/38; B30B 15/34
[52] U.S. Cl. ..................... 156/64; 156/285; 156/297; 156/583.91; 156/272.2; 156/583.6
[58] Field of Search ............... 156/64, 285, 297, 359, 156/382, 583.1, 583.6, 583.7, 583.91, 272.2, 273.3, 273.7, 274.4, 275.5, 299, 300; 29/462, 559, 156.8 P; 100/199, 208, 231, 269 R, 269 B; 384/903, 904, 97; 308/DIG. 11, DIG. 12; 440/50, 79, 51

[56] References Cited

U.S. PATENT DOCUMENTS

| | | | |
|---|---|---|---|
| 9,849 | 7/1853 | Brown | 440/50 X |
| 2,782,818 | 2/1957 | Christeson | 156/583.1 X |
| 3,096,145 | 7/1963 | Carnaut | 156/583.91 X |
| 3,956,058 | 5/1976 | Wemhoener | 156/583.1 |
| 4,352,707 | 10/1982 | Wengler et al. | 156/285 X |
| 4,528,057 | 7/1985 | Challenger et al. | 156/273.7 |

Primary Examiner—Edward Kimlin
Assistant Examiner—Ramon R. Hoch
Attorney, Agent, or Firm—Robert F. Beers; Arthur A. McGill; Prithvi C. Lall

[57] ABSTRACT

A method for bonding a thin metal sheet to a rigid body utilizes pneumatic cylinders compressing a spreader bar against components to be bonded. C clamps specially designed to hold the pneumatic cylinders are used to hold the components in place. Heat is applied to the bonding surfaces for curing for a predetermined period of time.

2 Claims, 8 Drawing Figures

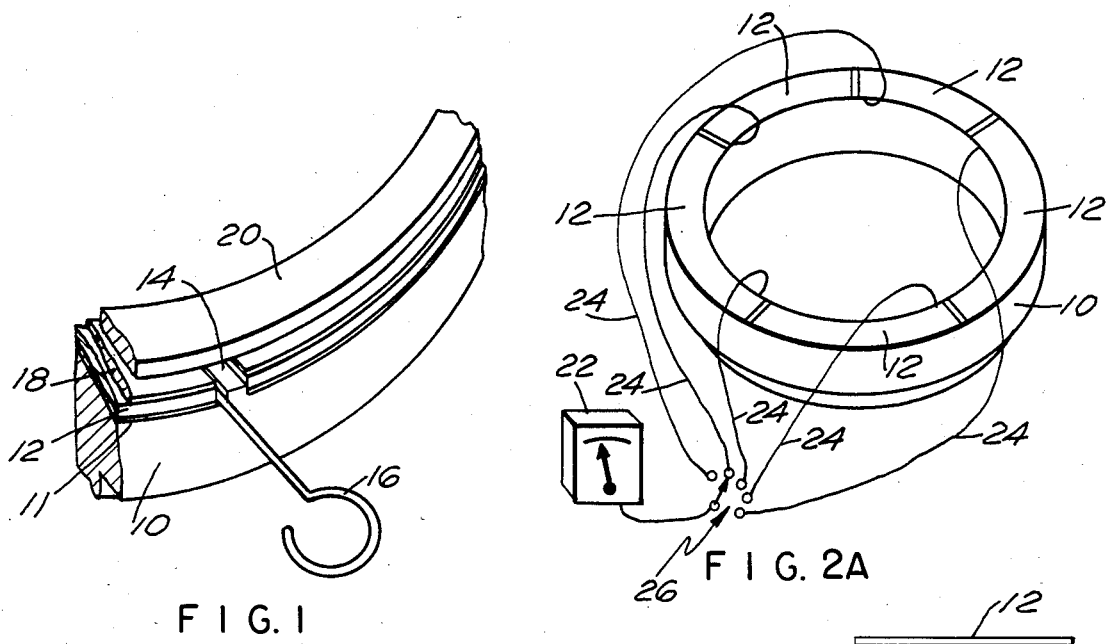
FIG. 1
FIG. 2A
FIG. 2B
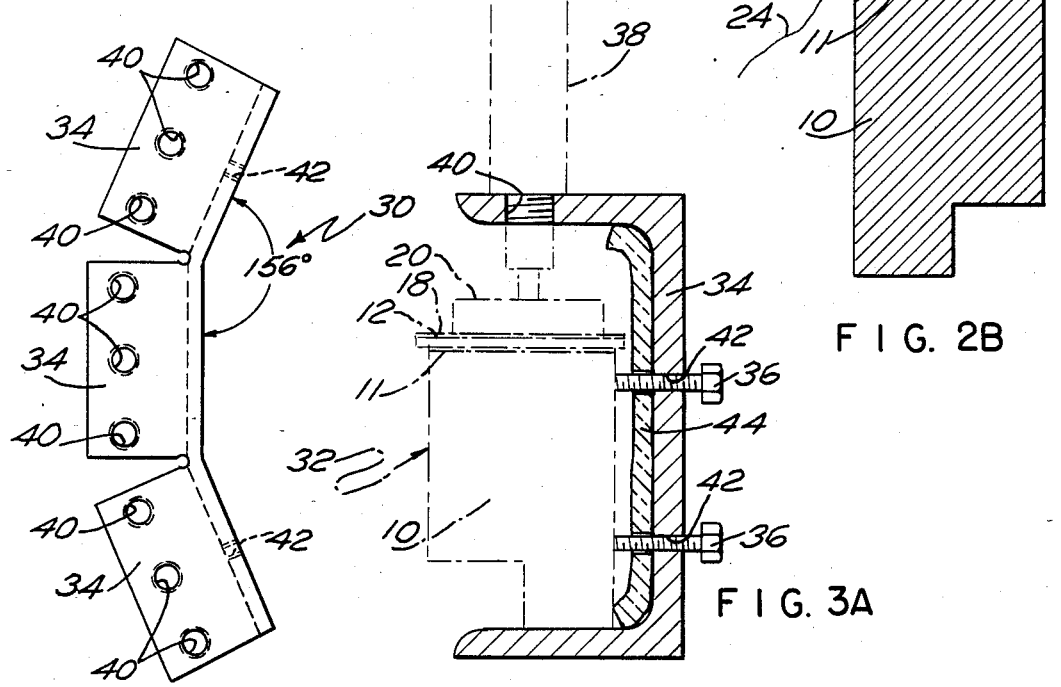
FIG. 3B
FIG. 3A

METHOD FOR BONDING A THIN SHEET TO A RIGID BODY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to the bonding of a thin metal sheet or group of sheets to a rigid body in a manner to assure that the outer surface of the sheet or sheets is planar and to obtain satisfactory adhesion. More particularly, there is described a method for bonding a self-lubricated metal sheet to a collar-type controllable pitch propeller hub bearing ring at the crank pin ring interface.

(2) Description of the Prior Art

In order that a thin sheet be held against a rigid body with pressure during the curing of the bonding agent, mechanical clamps are normally used. However, mechanical clamps do not provide uniform application of pressure over the entire plate surface resulting in the outer surface of the sheet not being planar. The efficacy of mechanical clamps for pressure is also affected by the fact that heat is often a necessary part of the curing procedure. Heat, because of the resultant thermal expansion, alters the setting of mechanical clamps.

SUMMARY OF THE INVENTION

A rigid body is oriented with the surface upwards to receive a thin metal sheet on top. An annular spreader bar is placed on top of the thin metal sheet. A group of rigid C-shaped clamping fixtures are provided which are configured so the rigid body is placed on the lower legs of the fixtures and the upper legs extend over the spreader bar. The upper leg of the clamping fixtures are conformed to receive and hold a plurality of pneumatic cylinders. Extensible ends of the pneumatic cylinders contact and push against the upper surface of the spreader bar which compresses the thin sheet against the rigid body. The pneumatic cylinders are all connected to a common pressure source.

The surfaces to be bonded are prepared in a suitable manner. The bonding agent is applied to the prepared surfaces. The spreader bar, clamping fixtures, and pneumatic cylinders are put in place. Heat is applied in a suitable manner for curing of the bonding agent if heat is needed to cure the adhesive. The proper amount of pressure between the rigid body and the metal sheet is provided by regulating the output pressure of the common pressure source for the pneumatic cylinders. This insures equal pressure on the thin metal sheet and uniform thickness of the bonding agent.

BRIEF DESCRIPTION OF THE DRAWINGS

FIG. 1 shows a portion of some of the components aligned in accordance with the present invention;

FIGS. 2A and 2B show temperature monitoring in accordance with the present invention;

FIGS. 3A and 3B show the clamping arrangement in accordance with the present invention;

DESCRIPTION OF THE PREFERRED EMBODIMENT

Figure 4:
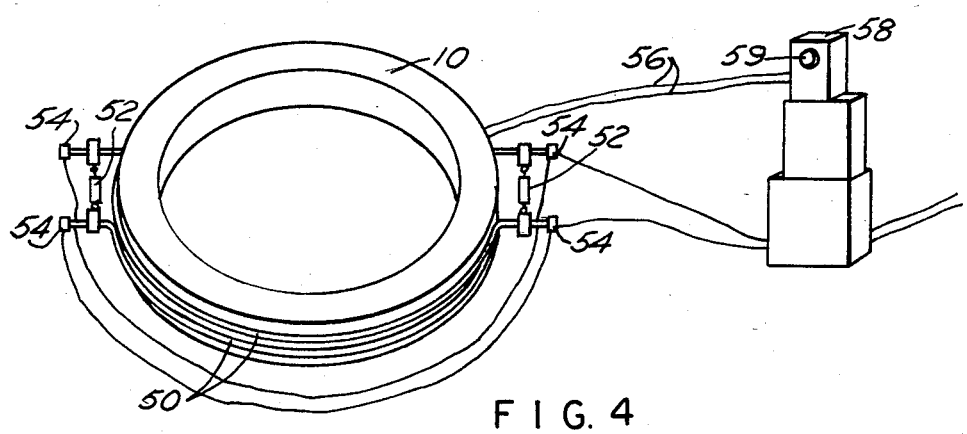
FIG. 4 shows the curing configuration in accordance with the present invention.

This is a procedure for bonding thin metal sheets coated with solid lubricant to the bearing ring at the crank pin ring interface of a DD-963 class propeller hub.

Referring to FIG. 1 there is shown a portion of several of the components arranged in the manner in which they are to be used in this procedure. In this embodiment, the solid lubricant coated thin metal sheets 12 are formed in segments, each segment forming a circular arc of slightly less than 72°. The surface of the bearing ring 10 is machined with five detents 14 to prevent excessive movement of the thin metal sheets if the adhesive 11 fails in service.

Prior to assembling the components as shown in FIG. 1, the bearing ring 10 is cleaned and a one part heat curing adhesive 11 is applied to an appropriate thickness. The adhesive 11 is also spread over the metal surface of one of the thin metal sheets coated with solid lubricant 12. In both cases a trowel is used to obtain uniform optimum spreading. After spreading the adhesive 11, immediately apply the two adhesive coated surfaces to each other. Prepare the remaining four thin metal sheets 12 using the same procedure and apply the thin metal sheets 12 to the bearing ring 10. Then clean exposed surfaces of excess adhesive.

The thin metal sheets 12 require clearance for thermal expansion. Set one side of the thin metal sheets 12 against the detent 14 on the bearing ring. Insert the gage wire 16 at the opposite end of the metal sheet 12 to set the clearance for a drag fit between the metal sheet 12 and the detent 14 on the bearing ring 10. Set the clearance on the four remaining metal sheets 12. Leave the gage wires 16 in place.

Cut a ring 18 from brown wrapping paper and place the paper ring 18 on the metal sheets 12. Place an annular spreader bar 20 on the paper ring 18 and align the paper ring 18 and bar 20 with the bearing ring 10. The paper ring 18 is placed on the lubricant side of metal sheets 12 to prevent the adhesive 11 from bonding to the spreader bar 20.

Refer now to FIGS. 2A and 2B wherein several components shown in FIG. 1 are omitted for ease in understanding. After application of the metal sheets 12, paper ring 18 and spreader bar 20 to bearing ring 10, as described with reference to FIG. 1, install a temperature monitor 22 and solder probe wires 24 to the edges of the metal sheets 12. The temperature monitor 22 is shown with a five position switch 26 for individual temperature readings of each metal sheet 12.

Support the present assembly off the working surface to provide clearance for the clamping fixtures 30 shown in FIGS. 3A and 3B. Install five clamping fixtures 30 to the bearing ring assembly 32, aligning each fixture 30 over a single metal sheet 12. Each fixture 30 has three clamping segments 34. Adjust the four spacing screws 36 on each clamping fixture 30 to align pneumatic cylinders 38 on the spreader bar 20 centerline. The clamping fixtures 30 each have nine apertures 40 for holding pneumatic cylinders 38. Each of the end clamping segments 34 of clamping fixture 30 also has two apertures 42 for holding spacing screws 36. A sheet of asbestos 44 is located along the inner wall of clamping fixture 30.

Refer now to FIG. 4 which shows the essential elements for the adhesive curing process. Bend and fit the two tubular heating elements 50 to the bearing ring 10. Each element 50 has a spring connection 52 located near terminals 54 to hold heating elements 50 to the bearing ring 10. Insure that the heating elements 50 are in full contact with the outside bearing ring 10 along the full curved length of the heating elements 50. Place the heating element terminal 54 for each heating element 180° apart.

Figure 5:
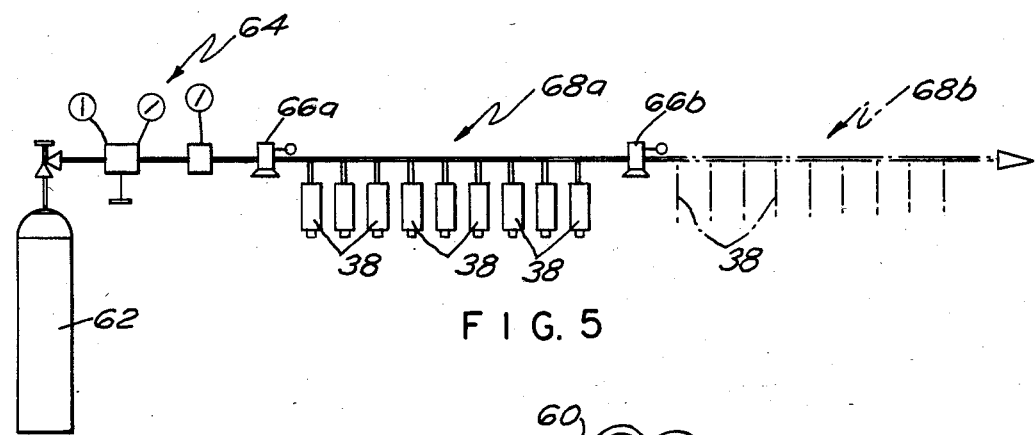
FIG. 5 shows a pictorial schematic of the pressurization of the pneumatic cylinders in accordance with the present invention.
Figure 6:
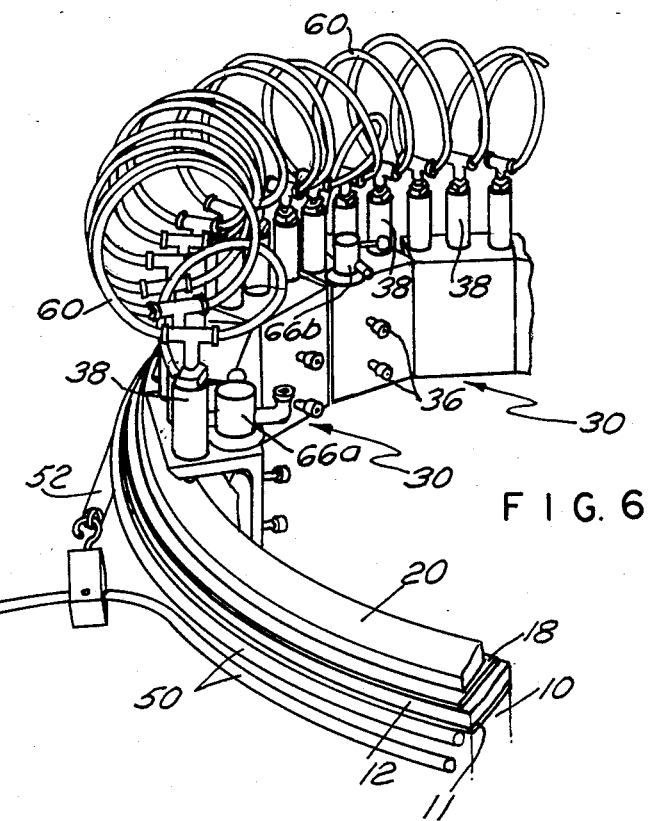
FIG. 6 is a representation of a portion of the assembly for the pressurization and curing processes in accordance with the present invention.

Refer now to FIGS. 5 and 6. Connect a plastic line 60 from a nitrogen cylinder 62 through valve and gages 64, and slide valve 66a to each pneumatic cylinder 38 on the first clamping fixture 68a in series. Then proceed through slide valve 66b and second clamping fixture 68b until all slide valves and pneumatic cylinders are connected. Only a sufficient amount of the plastic line 60 and pneumatic cylinders 38 are shown for an understanding of the invention. Pressurize each group of pneumatic cylinders to fifty psi starting with the first clamping fixture 68a. Check the system for any leaks and repair as required. Maintain pressure for ten minutes. Remove the displaced adhesive with a putty knife and wipe clean. Increase the pressure on the cylinders 38 to 200 psi. Remove the displaced adhesive and wipe clean.

For remainder of the operation refer to all figures. Remove the five gage wires 16 used to set the metal sheets 12 for thermal expansion. After removing the gage wires 16 do not move the metal sheets 12 or make any adjustments in the spreader bar 20, pneumatic cylinders 38 or clamping fixtures 30.

Check that the heating element terminal connections 54 are set 180° apart. Locate the upper element 50 one inch below the metal sheet 12. Locate the lower element 50 one-half inch below the upper element 50. Insert the temperature probes on lines 56 from the temperature controller 58 in the spaces between detents 14 and spreader bar 20. This space can be seen in FIG. 1. Temperature monitoring is to be taken at the bondline only. Connect the temperature controller 58 to a power source (not shown) and apply power to the controller 58. Set the temperature controller knob 59 to 300° F. Record the time of the start of the heat application.

The following list defines typical curing times required for various temperatures:

250 deg F.—40 min
300 deg F.—10 min (curing temperature)
350 deg F.—5 min
400 deg F.—30 sec The time required to raise the bearing ring to 300° F. at the bondline is approximately one hour fifteen minutes. Monitor and record the temperature at each probe 24 every five minutes. One hour after the start of the heat application rotate each of the tubular heaters 50 ninety degrees in the same direction, either clockwise or counterclockwise, from their original position to uniformly heat the bearing ring 10. After rotating the tubular heaters 50, record the time and continue heating the ring at 300° F. until the lowest temperature of the five monitored metal sheets 12 reaches 300° F. Continue heating for ten minutes to cure the adhesive. A typical range of monitored points is 300° F. to 350° F. Bonding is complete at the end of this period.

Upon completion of the bonding, remove power from the tubular heaters 50. Continue to apply 200 psi to the pneumatic cylinders 38 until the bearing ring 10, metal sheets 12 and spreader bar 20 temperatures have dropped to 125° F. or lower. This takes approximately three hours. Do not attempt any disassembly of the spreader bar 20 or clamping assembly 30 until the highest temperature probe 24 is 125° F. or lower.

When the highest temperature probe 24 has reached 125° F. or lower, remove the clamping assemblies 30.

The above method enhances the bonding by providing tight control and an even distribution of the pressure between the metal sheets 12 and the rigid bearing body 10 during curing. It enhances the resulting smoothness of the outer surface of the thin plate 12 by eliminating areas of high pressure which might cause the bonding agent 11 to cure at an uneven thickness. The pressure on the thin metal sheets 12 is unaffected by changes in temperature or thermal gradients.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for bonding a plurality of thin metal sheets to a bearing ring having a plurality of detents comprising the steps of:
   applying adhesive for bonding to a surface of at least one of said bearing ring and a said plurality of thin metal sheets;
   contacting said plurality of thin metal sheets to said bearing ring with each of said metal sheets located between successive detents and one end of each of said metal sheets abutting a detent;
   placing a gage wire between the other end of each of said metal sheets and respective detents;
   placing a spreader bar over said contacted surfaces;
   connecting temperature monitoring probes to said thin metal sheets;
   clamping said bearing ring, then metal sheets and spreader bar together with a clamp having pneumatic cylinders with extensible ends for compressing the elements to be bonded; and
   connecting heating elements to said clamped elements;
   applying pressurized gas to said pneumatic cylinders for compressing the clamped elements;
   removing said gage wire placed between the other end of each of said metal sheets and respective detents;
   applying heat to said clamped elements for curing said adhesive.

2. A method for bonding a plurality of thin metal sheets to a bearing ring having a plurality of detents according to claim 1 wherein said thin metal sheets are coated on one side with a solid lubricant.

* * * * *